Nov. 18, 1958 W. C. VAN CLIEF, JR 2,860,354
MOUNTINGS FOR ROTARY BRUSHES
Filed May 13, 1955 3 Sheets-Sheet 1

INVENTOR.
WILLIAM C. VAN CLIEF JR
BY
Oscar L. Spencer
ATTORNEY

Nov. 18, 1958 W. C. VAN CLIEF, JR 2,860,354
MOUNTINGS FOR ROTARY BRUSHES
Filed May 13, 1955 3 Sheets-Sheet 2

INVENTOR.
WILLIAM C. VAN CLIEF JR
BY Oscar L. Spencer
ATTORNEY

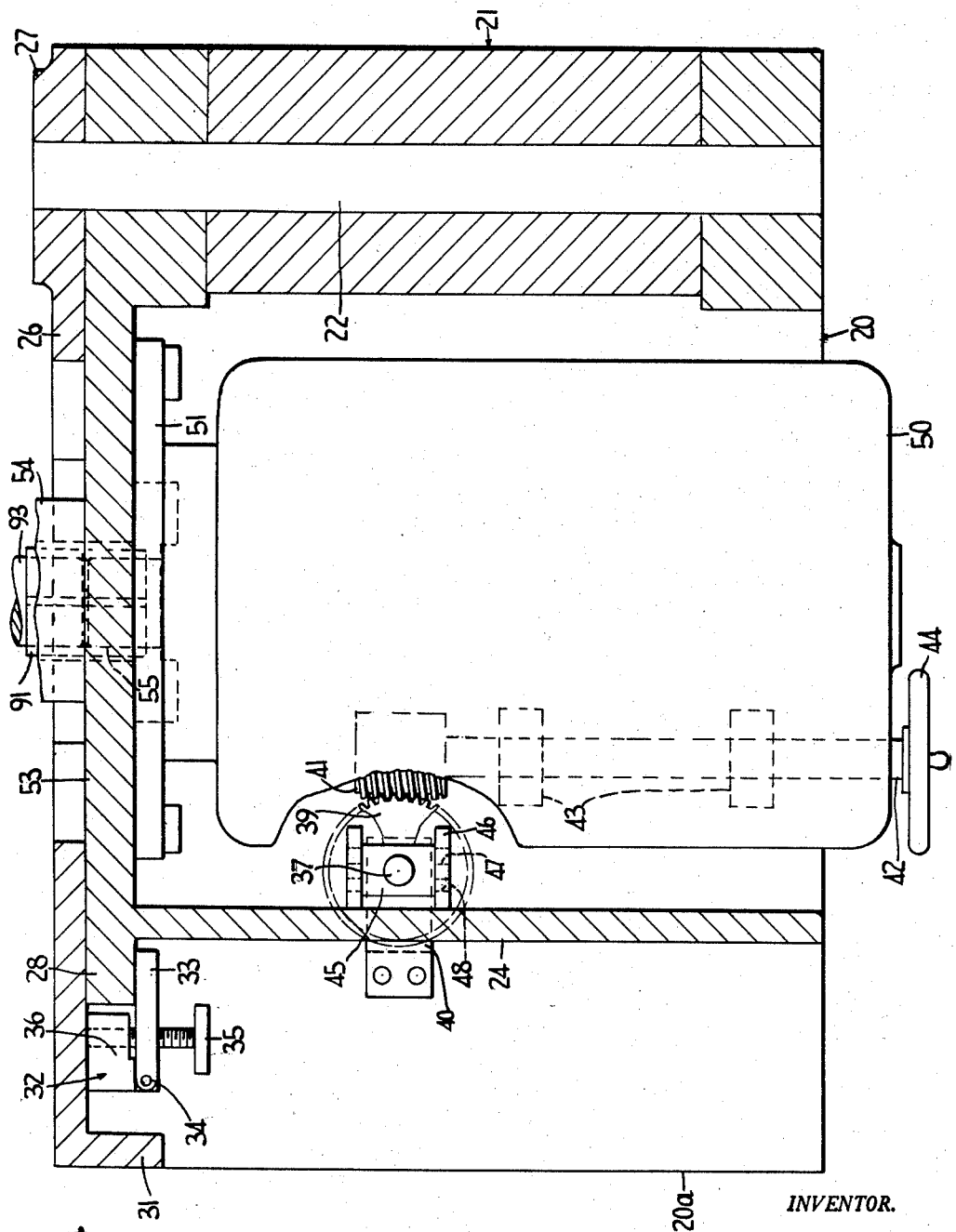

United States Patent Office 2,860,354
Patented Nov. 18, 1958

2,860,354

MOUNTINGS FOR ROTARY BRUSHES

William C. Van Clief, Jr., Baltimore, Md., assignor to Pittsburgh Plate Glass Company, a corporation of Pennsylvania Application May 13, 1955, Serial No. 508,234

8 Claims. (Cl. 15—21)

This invention relates to rotary brush mounting and driving means and it has particular relation to such means as is employed for mounting and driving brushes for cleaning or clearing endless belt conveyors employed in the transportation of crushed ore, coal, grain, stone, broken glass or other particulate material.

Cleaning of the conveyor belt surface is especially desirable in those instances where the return or lower reach thereof is conducted over idler rollers to give it support. If the belt is employed to carry an abrasive material, such as broken glass, crushed stone, ore or the like, particles may adhere to its surface and the supporting rollers will press them against the surface with an abrading action. If this is repeated a number of times, a particle may be embedded in the surface. To obviate this effect, the lower surface of a return of a belt after it has passed over the discharge roller may be subjected to brushing with a power driven brush which will knock free any adherent particles of the material being transported.

As heretofore employed, the brushes have usually been mounted upon shafts journaled at each end of the brush in appropriate bearings, such as split bearings. Brushes so mounted were driven by power means appropriately connected to the shaft of the brush by driving connections such as gears, belts, sprocket chains or the like. Such brushes, as they became worn or if the apparatus required repairs, could only be removed from their mountings by completely taking apart the bearings. If adjustments were required to compensate for wear of the brushes, difficulty was also involved since the brushes were usually mounted in fixed bearings. If a brush so mounted was to be repaired or adjusted, considerable time was required which often meant that the conveyor system itself was out of commission during such time. The delays involved in repairing, replacing or adjusting the brushes, therefore, were often expensive. The proper maintenance of brushes mounted in the conventional manner often required the services of a relatively skilled mechanic or maintenance man, if the optimum in life and efficiency was to be obtained from a given brush.

The present invention comprises as one feature, the provision of a brush mounting structure which constitutes a distinct, self-contained, preformed unit and which as such can be installed in operative relationship to any desired conveyor system without substantial modification of the latter. As a second feature the invention comprises mounting a tubular or annular brush longitudinally, slidably upon a hollow roller-like core which in turn is mounted to rotate upon a tubular cantilever support. The support houses a coaxial drive shaft which is non-rotatably secured with respect to a closure; a cap is mounted upon the end of the core and the edge thereof is pressed against the end of the brush to hold the same firmly in position. As a third feature, the invention comprises mounting the foregoing cantilever brush structure upon a swinging lever adapted to be adjusted toward or away from the conveyor belt to compensate for changing bristle length or other changing conditions.

For a better understanding of the invention, reference may now be had to the accompanying drawings in which like numerals refer to like parts throughout and in which:

Fig. 4 is a sectional view on the line IV—IV of Fig. 2.

Figure 1:
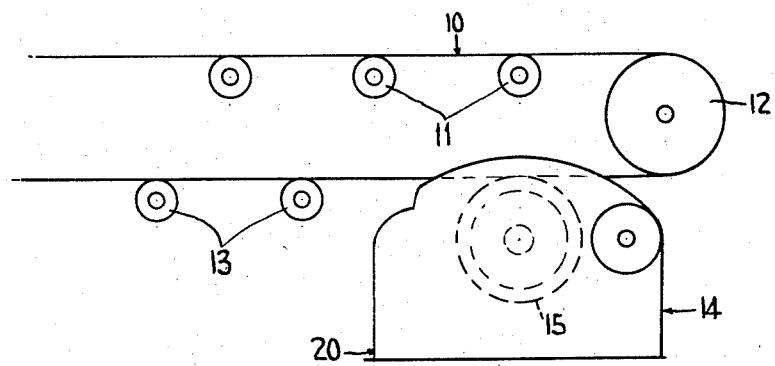
Fig. 1 is a diagrammatical view illustrating the arrangement of a conveyor and a brush and mounting embodying the invention.
Figure 3:
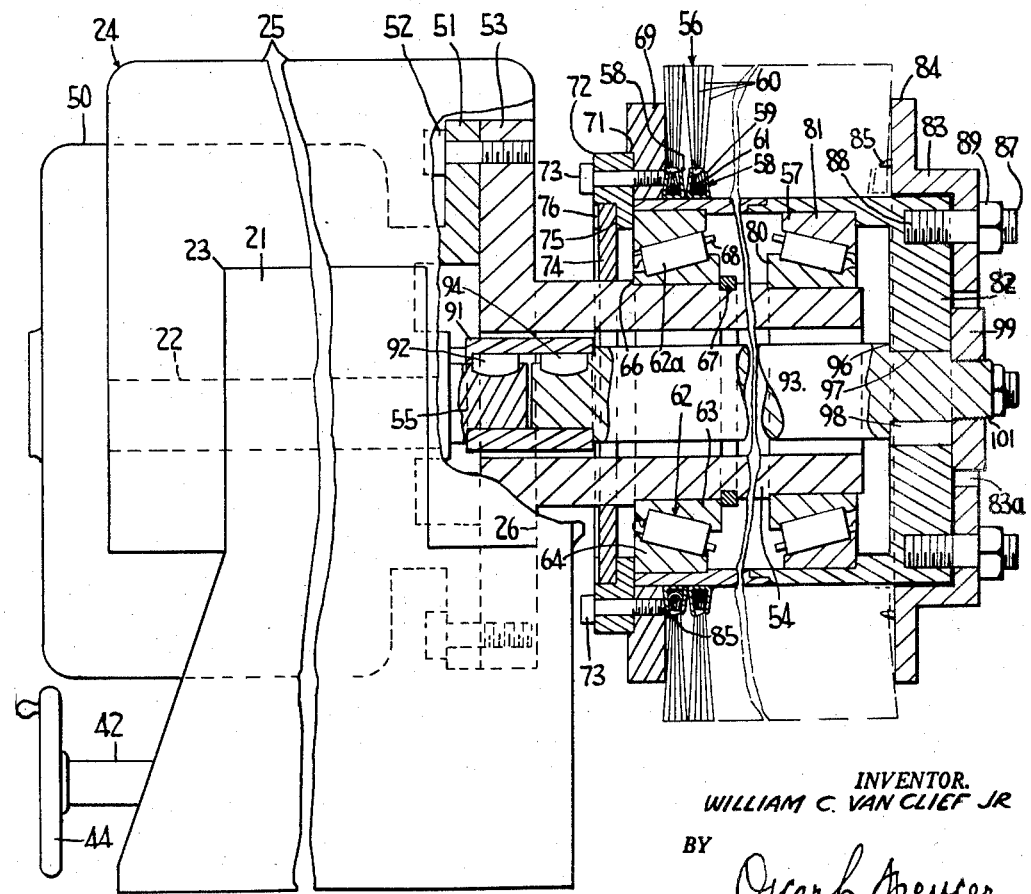
Fig. 3 is a view partly in end elevation and partly in section of the construction as shown in Fig. 2.
Figure 2:
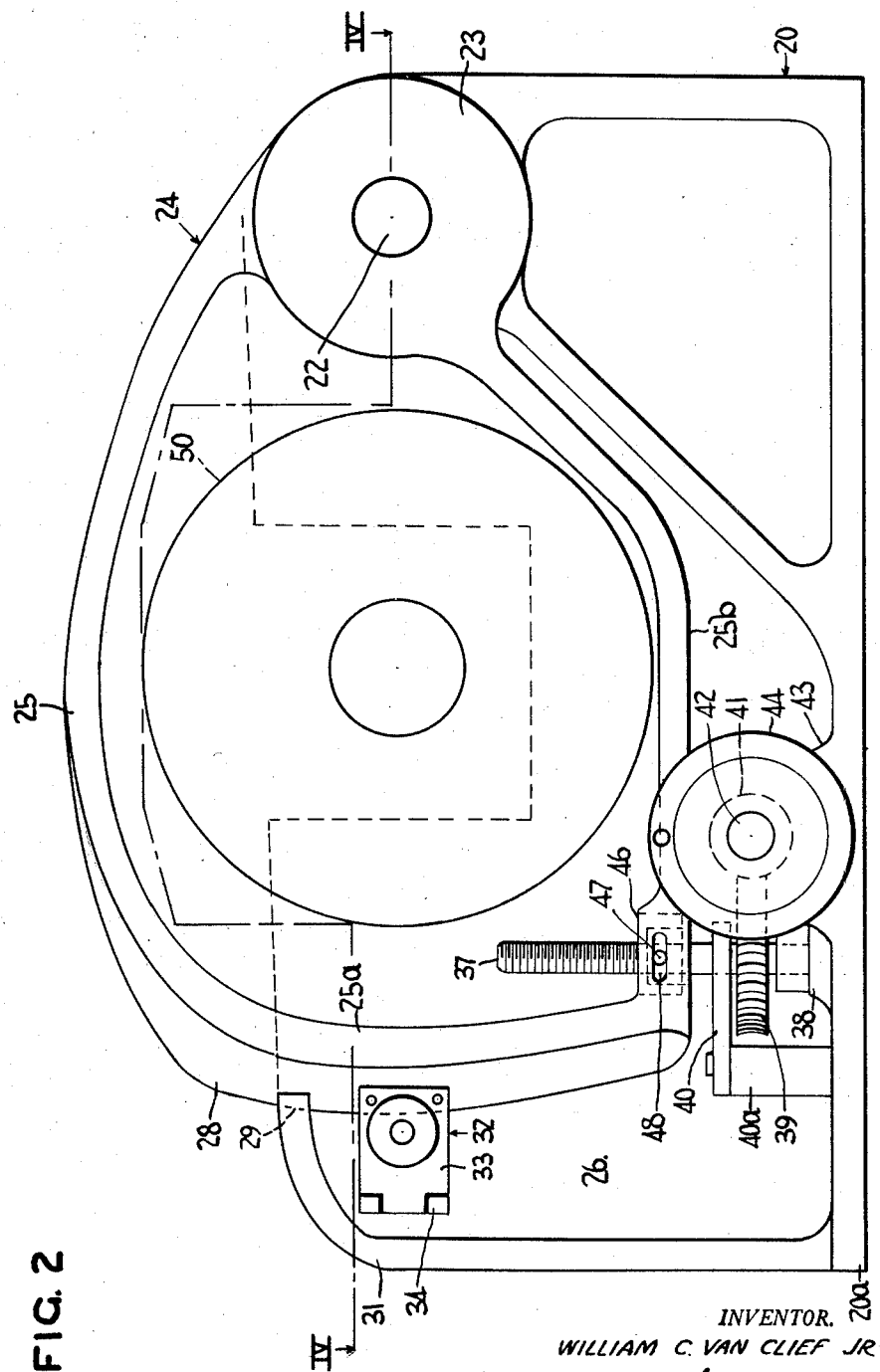
Fig. 2 is a side elevational view of a brush mounting and driving mechanism constructed in accordance with the provisions of the invention.

A conveyor which may be an endless belt of appropriate width is indicated at 10 and travels upon rollers in conventional manner. Such conveyor may be used to transport materials, particles which will adhere to and abrade the belt. The upper reach travels on rollers 11 and over a discharge roller 12 to deposit the particulate material being carried. The return reach is carried upon idler rollers 13. Brush mounting 14, having a power driven brush 15, is disposed contiguous to the discharge roller so that the brush contacts the lower reach before it starts over the rollers 13.

A brush mounting 14, constructed in accordance with the provisions of the present invention, for cleaning the belt comprises a base 20, having a bottom 20a and being adapted to be secured to a floor or other support. The pedestal is provided with a bearing portion 21 in which is mounted a transverse shaft 22 with a bifurcate portion 23 of a vertically swingable frame 24 journaled thereupon. One portion of the bifurcation 23 is disposed in a slot provided by a web 26, which is spaced with respect to the bearing portion 21 and is provided with a bearing 27 for the shaft 22. Frame 24, in effect, comprises a top 25, end 25a and bottom 25b and constitutes a cover or housing for a motor driving mechanism to be described. At its forward or swinging edge and upon one side thereof (e. g. the side toward the conveyor structure), it is provided with a fin 28 which is arcuate and has its center of curvature coinciding with the axis of the shaft 22. This web is disposed within a groove 29 in flange 31 upon the forward end of the web 26. Web 26 may be engaged by a frictional locking mechanism, such as is indicated at 32 upon web or wall 26. It may, for example, comprise a friction plate 33 hinged as indicated at 34 and being actuated to engage the side of web 26 by a hand wheel 35 upon a screw threaded shaft 36.

Means whereby the frame 24 may be accurately adjusted to any desired angle upon its shaft 22, comprises a vertical screw 37 which is journaled in a bearing 38 upon the base portion 20a of the pedestal 20. Means to rotate the screw comprises a worm gear 39 rigidly mounted upon the screw and being engaged by a driving worm 41 upon a horizontal shaft 42 journaled in bearing 43 on floor 20a. Means providing an additional bearing for screw 37 comprises a plate 40 having a bearing hole formed therein and being secured upon a boss 40a upon bottom 20a. The shaft is provided at its outer extremity with a hand wheel 44 by means of which it can be rotated in order to rotate the worm.

An operating connection between the screw 37 and the frame 24 comprises a nut 45 which preferably is disposed to slide between machined surfaces of guides 46 on the floor 25b. The nut is also provided with trunnions 47 in guide slots 48 in guides 46. When the hand wheel 44 is rotated to turn the screw 37, the nut 45 is caused to move vertically so that the frame 24 is tilted about shaft 22 owing to the force exerted by trunnions 47 in slots 48. The trunnions permit relative rotation between the frame 24 and the nut. Therefore, the trunnions should be parallel to the shaft 22.

Means to drive a rotary brush (subsequently to be described) comprises an electrical motor 50 which preferably is completely enclosed to exclude dust and possibly gases and which comprises a securing flange 51 at one end thereof and extending peripherally thereabout. Stud bolts 52, extending through suitable openings in the flange 51 and being threaded into the vertical web 53 of the frame 24, constitute means for securing the flange to the web. Means rotatably to mount the brush, previously alluded to, upon the frame 24 comprises a cantilever tubular bearing support 54 integral with, or otherwise suitably secured to the web 53 in coaxial alignment with respect to the drive shaft 55 of the motor 50.

A rotary brush 56 of cylindrical, tapered or other appropriate longitudinal profile and being usually of a length as great as or greater than the width of the conveyor belt, is mounted upon a roller 57 functioning as a core upon the tubular support 54. The latter supports brush elements 58, which may comprise conventional annular sections, or a continuous spiral of a channel strip 59 appropriately mounted thereupon. These form a tube-like brush unit that will slip on or off of the core 57. The brush elements are provided with bristles 60 suitably secured, as for example by doubling about a locking element 61 in channel 59. The bristles preferably are filamentary and may be of wire, or other appropriate material. It is to be understood that the invention is not limited to the use of bristle brushes. The bristles may be replaced by fins or paddles extending longitudinally of, or spirally about the brush core 57. The term brush, as herein employed, includes such devices.

Means to mount the inner end of the core 57 for rotation upon the tubular member 54 comprises a bearing 62 which as shown, is of the conventional thrust roller type having rollers 62a inclined with respect to the axis of the core 57 toward the adjacent end thereof. The bearings comprise inner and outer spaced races or rings 63 and 64 which engage the surfaces of the rollers. The race 64 at the end adjacent to the web 53 engages a shoulder 66 extending about the tubular member 54 and at the opposite end it is locked from longitudinal displacement by means of a split key ring 67 disposed in a perimetrically extending slot in the tubular member 54. A ring 68, between the races 63 and 64, has openings formed therein for the rollers and provides means for maintaining the rollers in properly spaced relationship with respect to one another.

It will be observed that the brush 56 is provided at the end contiguous to the motor 50, with an annular flange 69 which is welded upon or otherwise secured to the core 57 and engages the contiguous brush element or the contiguous portion of the later, dependent upon the construction of the brush (laminar or helical). The flange 69 is rabbeted, as indicated at 71, to provide a seat for a ring 72 which is releasably secured to the flange by means of stud bolts 73 extending through appropriate openings in the ring and being threaded at their extremities in the flange 69. A sealing ring 74 is mounted in a rabbet 75 formed as indicated at 76 in the ring 72 and at its inner perimeter, it rotates upon the tubular member 53 thus to a substantial degree, excluding dust from the roller bearings which have been described.

The opposite extremity of the brush structure is supported upon a second roller bearing structure 80 preferably of the radial-thrust type, and like the one already described, having the rollers 81 thereof inclined, in this instance, outwardly from the adjacent end of the tubular member 54.

It will be apparent that one of, or both of, the roller bearings 62 and 80 may be replaced by other types of bearings of reasonably good antifriction properties. However, it is presently deemed that roller bearings are particularly effective.

The core 57, at its outer extremity, is provided with a closure or end portion 82 and is also covered by a removable cap member 83 having a central opening 83a and a flange 84 designed to secure the brush elements upon the core. Means to lock the cap element 83 upon the core comprises screws 86 which, as shown, have oppositely threaded end portions 87 and 88; the portion 88 being threaded into the web portion 82 and the portion 87 being provided with a nut 89 for locking the cap upon the brush core and drawing flange 84 tightly against the brush element or elements 58. It is to be appreciated that teeth 85 may be provided upon either or both of members 69 and 84. These teeth project longitudinally and engage the outer perimeter of the channel 59 to hold or to assist in holding the latter in position.

A driving connection between the shaft 55 of the motor 50 and the brush core 57 comprises a coupling collar 91, one end of which is secured non-rotatably upon the shaft 55 by means of a suitable key 92 disposed in a keyway of conventional design. The opposite end of the collar 91 receives the inner extremity of a floating drive shaft 93 which is secured against rotation in the collar by means of a key 94, similar to the key 92. The outer extremity of shaft 93 is shouldered as indicated at 96 and is disposed in a central opening 97 in the closure 82. Means to secure the web and the shaft to provide a driving connection comprises a key 98 disposed in suitable keyways in the two. Further means to secure the shaft 93 against longitudinal displacement in the openings 97 comprises a nut 99 threaded as indicated at 101 upon the shaft. Should it be desired to remove a brush element, such as a strip 59 from the core 57, nuts 89 may readily be unscrewed and the cap 83 can be removed from the end of the core and the brush element can then, in turn, be slipped off for repairing or replacement, as may be desired. When the new unit is in place, the cap is returned and secured by the nuts, thus clamping the element securely in place.

Assuming that a brush has become worn, thus reducing its diameter, or if for other reason, the brush is not at the proper distance from the conveyor belt to obtain optimum brushing action upon the latter, the relative distance of the brush with respect to the conveyor belt can be changed at will and without interrupting operation of the latter, merely by rotating the hand wheel 44 to change the angle of the frame 24 upon its bearing shaft 22.

It is to be observed that the brush mounting and driving structure are constructed as a unit which can be purchased as such and installed in operative relationship with practically any conveyor system without altering the mechanism of the latter, thus requiring but little, or no interruption of the operation of the system for installation.

While the brush and mounting have been illustrated in combination with a conveyor system comprising a traveling belt and more particularly in position to brush the return reach thereof in order to prevent abrasion of the belt surface by adherent particles in passing over the rollers supporting said reach, the construction is susceptible of wider application than this. For example, it may be employed to brush material from the upper reach, or for brushing material from the belt as it passes over the discharge roller 12. The construction could also be used in brushing strips of fabric or in cleaning strips of sheet steel before or after pickling, plating, galvanizing or other operations. It is also contemplated that the brush may be employed to brush objects of sheet, or other form disposed upon trucks or cars which may be moved automatically or by hand. For example, it might be employed in the cleaning of plate glass upon the cars of a grinding line employed in surfacing plate glass. They are but illustrative of the various uses to which the construction may be put.

I claim:

1. A brush mounting comprising a base, a frame journaled upon the base and having a web normal to the axis of rotation of the frame, a driving motor secured upon the web with the axis thereof normal to the web, a tubular support for a rotary brush secured upon the web in coaxial alignment with the axis of the motor, a rotary brush having a tubular core mounted to rotate upon the support, a shaft from the motor extending through the support, a cap member upon the end of the core beyond the tubular support and being drivingly connected to the shaft and to the core.

2. A brush mounting comprising a base, a frame journaled upon the base and having a web normal to the axis of rotation of the frame, a driving motor secured upon one side of the web with the axis thereof normal to the web, a tubular support for a rotary brush secured upon the web upon the side opposite the motor and in coaxial alignment with the axis of the motor, a ring-like antifriction bearing upon the support, a rotary brush having a tubular core mounted upon the bearing, a shaft from the motor extending through the support, a cap member upon the end of the core beyond the tubular support and being drivingly connected to the core and to the shaft.

3. A brush mounting comprising a base, a frame journaled upon the base and having a swinging end, said end being secured by means for adjustment of the angular position thereof, a web in the frame normal to the journal thereof a driving motor secured upon the web with the axis thereof normal to the plane of movement of the same, a tubular support for a rotary brush secured upon the frame in coaxial alignment with the axis of the motor, a rotary brush having a tubular core mounted to rotate upon the support, a shaft from the motor extending through the support, a cap member upon the end of the core beyond the tubular support and being drivingly connected to the shaft whereby rotation of the shaft rotates the core, said cap being secured to the core by means permitting quick release thereof.

4. A brush mounting comprising a base, a frame journaled upon the base, and having a web normal to the axis of rotation thereof, a driving motor secured upon the web with the axis thereof normal to the web, a tubular support for a rotary brush secured upon the web in coaxial alignment with the axis of the motor, a rotary brush having a tubular core mounted to rotate upon the support upon roller bearings interposed between the support and the core, a shaft from the motor extending through the support, a closure for the outer extremity of the core and having an opening formed therein for the extremity of the shaft, a cap-like member fitting over the end of the core and being secured thereto by screw means, said cap having a peripheral flange engaging a tubular brush upon the core, said brush being removable upon removal of the cap from the core.

5. A brush construction comprising a frame, a said frame being swingable about an axis upon a base, means angularly to adjust the position of the frame, a web in the frame, normal to the axis thereof, a tubular brush support secured to the web and projecting normally therefrom, a coaxial drive shaft rotatably disposed within the support, motor means upon the web to drive the shaft and being upon the side of the web opposite the tubular brush support, a tubular core rotatable upon the support and being secured against longitudinal displacement upon the support, said core being provided with an annular flange at the end contiguous to the motor means and having a closure at the opposite end, said closure having a central opening formed therein receiving the extremity of said shaft and being non-rotatably fixed with respect thereto, a cap fitted upon said core and being non-rotatably fixed with respect thereto by screw fastenings, said cap having an edge flange projecting radially beyond the core, and a tubular brush element mounted upon the core and being clamped between the two aforementioned flanges.

6. A brush mounting comprising a base, a frame journaled upon the base, and having a web normal to the axis of rotation thereof, a driving motor secured upon the web with the axis thereof normal to the web, a tubular support for a rotary brush secured upon the web in coaxial alignment with the axis of the motor, a rotary brush having a tubular core mounted to rotate upon the support upon bearings interposed between the support and the core, a shaft from the motor extending through the support, a closure for the outer extremity of the core and having an opening formed therein for the extremity of the shaft, a cap-like member fitting over the end of the core and being secured thereto by screw means, said cap having a peripheral flange engaging a tubular brush upon the core and being removable upon removal of the cap from the core.

7. A brush mounting comprising a base, a frame journaled to swing upon the base and comprising a web normal to the axis of rotation of the frame, a motor mounted upon the web with the axis thereof in normal relationship with respect to the web, fins upon the web providing a housing for the motor, said web further having an opening formed therein, a drive shaft from the motor extending through the opening, a tubular support mounted upon the web upon the opposite side from said motor and being disposed in coaxial alignment with the axis of the motor, a rotary brush having a tubular core mounted to rotate upon the support, the shaft from the motor extending through the support, a cap member upon the end of the core beyond the tubular support and being secured by screw means to the core to provide a driving connection between the shaft and the core.

8. A brush mounting comprising a base, a frame journaled to swing upon the base and comprising a web normal to the axis of rotation of the frame, a motor mounted upon the web with the axis thereof in normal relationship with respect to the web, fins upon the web providing a housing for the motor, said web further having an opening formed therein, a drive shaft from the motor extending through the opening, a tubular support mounted upon the web upon the opposite side from said motor and being disposed in coaxial alignment with the axis of the motor, a rotary brush having a tubular core mounted to rotate upon the support, the shaft from the motor extending through the support, a cap member upon the end of the core beyond the tubular support and being secured by screw means to the core to provide a driving connection between the shaft and the core, said web being formed at its swinging end with an arcuate edge fin concentric with the axis of rotation, and clamp means to engage the arcuate fin to hold the frame in a desired position of angular adjustment.

References Cited in the file of this patent

UNITED STATES PATENTS

| | | |
|---|---|---|
| 766,013 | Baldwin | July 26, 1904 |
| 1,871,007 | Raisch | Aug. 9, 1932 |
| 2,202,285 | Dunnam | May 28, 1940 |
| 2,430,843 | Colwell | Nov. 11, 1947 |

FOREIGN PATENTS

| | | |
|---|---|---|
| 521,370 | Great Britain | May 20, 1940 |